Figure 1:
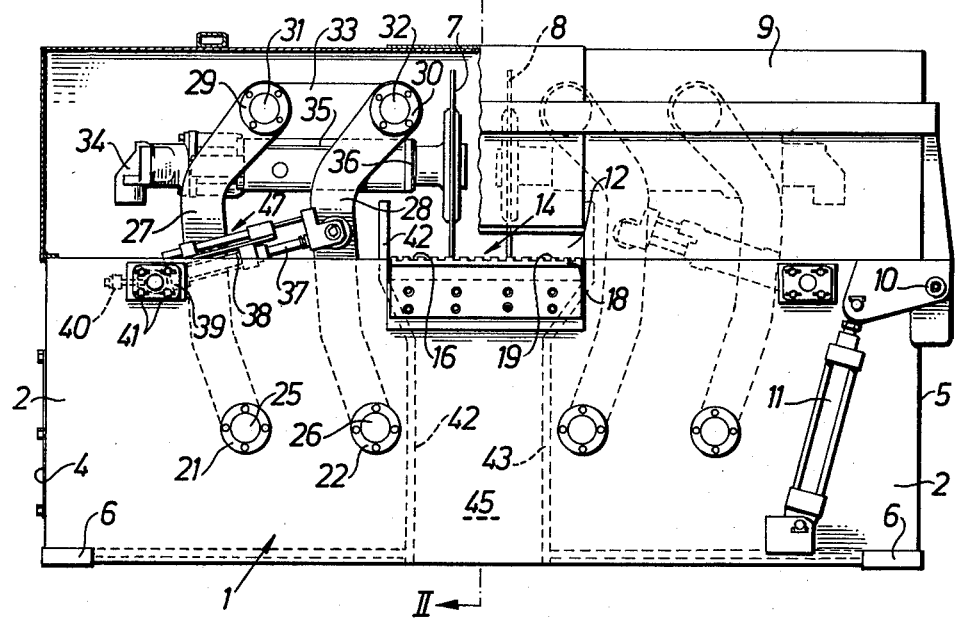

United States Patent [19]

Erikson

[11] 4,384,501
[45] May 24, 1983

[54] EDGER

[75] Inventor: Per Erikson, Iggesund, Sweden

[73] Assignee: AB Iggesunds Bruk, Iggesund, Sweden

[21] Appl. No.: 233,163

[22] Filed: Feb. 10, 1981

[30] Foreign Application Priority Data

Feb. 15, 1980 [SE] Sweden ............................ 8001246

[51] Int. Cl.³ .............................................. B27B 5/04
[52] U.S. Cl. ............................... 83/425.2; 83/425.4; 83/315
[58] Field of Search ................... 83/315, 425.2, 425.3, 83/425.4

[56] References Cited

U.S. PATENT DOCUMENTS

| | | | |
|---|---|---|---|
| 1,944,718 | 1/1934 | Rafter | 83/315 |
| 2,534,977 | 12/1950 | Kling | 83/315 |
| 3,267,785 | 8/1966 | Pferdekamper | 83/315 |
| 3,710,836 | 1/1973 | Busch | 83/425.4 |
| 3,837,247 | 9/1974 | Morse et al. | 83/425.4 |
| 4,022,094 | 5/1977 | Hetherington | 83/425.4 |

*Primary Examiner*—Donald Schran
*Attorney, Agent, or Firm*—Burns, Doane, Swecker & Mathis

[57] ABSTRACT

The invention discloses an edger having at least one edging means (7). For displacement of the edging means substantially perpendicularly to the feeding direction of a board to be edged at least one pendulum arm (27) is provided which is swingably about a substantially vertical position and is journalled around an axis (25) parallel to the feeding direction and located underneath the feeding plane (16). In its upper end the pendulum arm carries the edging means (7) and its driving means (34,35).

3 Claims, 2 Drawing Figures

EDGER

The present invention concerns an edger including at least one edging means, driving means for the edging means, and means for displacement of the edging means substantially perpendicularly to a feeding direction of boards to be edged and which are fed on a feeding plane.

One object of the invention is to provide an edger which is compact and, thereby, on a minor space may be assembled with other similar units. The edger shall also allow very fast adjustment of the edging means to a chosen edging width.

These objects have been achieved in that the invention has been given the characteristic features stated in the annexed claims.

By at least one pendulum arm being arranged to displace the edging means and to support the driving means thereof, and by the swinging axis of this pendulum arm being substantially parallel to the feeding direction of boards to be edged, several similar edgers can be arranged in a row after each other with coaxial swinging axes, or, preferably, a common swinging shaft for corresponding pendulum arms. An arrangement with a common shaft extending between, and possibly through, several edgers brings about an essentially simplified alignment of the individual edgers at an assembly of a plurality of such edgers.

By the fact that the means for displacement of the edging means include a parallelogram device comprising two pendulum arms, a very precise and stable control of the edging means and its driving means is obtained. Further, in that the common centre of gravity of the edging means and its driving means is located in or at least close to a vertical plane through the swinging axis of the pendulum arm, or, in the case of a parallelogram device, an axis-parallel vertical plane through the centre point between the swinging axes of its two pendulum arms, the main range of displacement of the edging means can be located at or close to the dead point position of the pendulum arm or of the parallelogram device, which results in that relatively small forces are needed for the displacement, which, thus, can be performed quickly which is of great importance when an edger is an integral part of an automatic, computer-controlled so called optimizing plant.

When further each pendulum arm comprises two arms spaced in the direction of the swinging axis, and the driving means for the edging means being arranged between said two arms, preferably suspended under the upper ends of the pendulum arms, an additionally improved control of the displacement of the edging means is achieved, promoting the accuracy of the edging operation.

THE DRAWINGS

Figure 2:
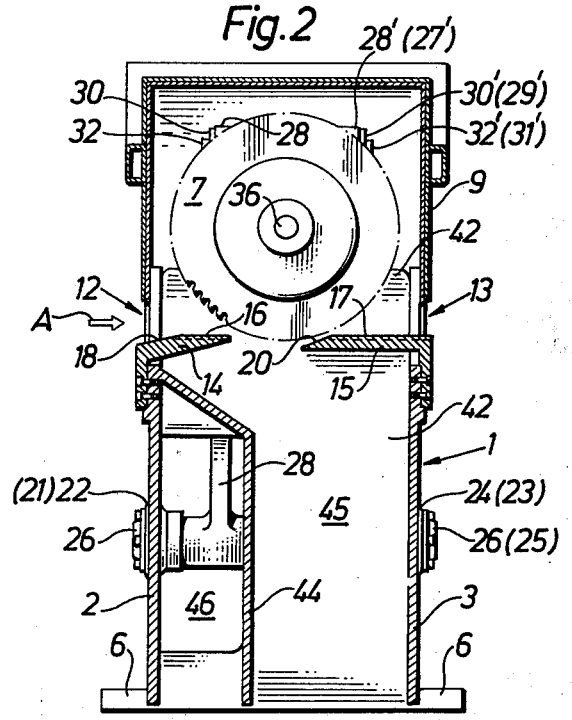

An embodiment of the invention will now be described, reference being made to the accompanying drawing, wherein FIG. 1 is a view from the feeding side of an edger according to the invention having its cover cut off along line II—II, and FIG. 2 shows a section taken along line II—II of FIG. 1.

The edger is built up on a substantially box-shaped housing or stand 1 having a front wall 2, a back wall 3 and two side walls 4 and 5. The stand 1 is suitably provided with feet 6 for its attachment to a flooring.

As is usual in edgers also the edger shown is provided with two edging or trimming blades 7 and 8 having its associated driving and displacement means. Above these and resting on the stand is a cover 9 which is raisable by swinging about a shaft 10 by means of a hydraulic cylinder 11. A recess in the lower edge of each of the longer sides of the cover form an infeed and outfeed opening 12, 13, respectively. The infeed opening 12 is downwardly defined by an infeed table 14 which is screwed onto the front wall 2. In the same manner the outfeed opening 13 is downwardly defined by an outfeed table 15. The infeed table has a horizontal portion 16 and the outfeed table a horizontal portion 17. These horizontal portions form the feeding plane of the edger. For facilitated guiding of a board the infeed table 14, in the area of the infeed opening 12, has an inclined surface 18, which merges in the horizontal portion 16. This, as well as the horizontal portion 17 of the outfeed table, may be provided with grooves 19 extending in the feeding direction (arrow A of FIG. 2). Also the outfeed table is provided with an inclined surface 20 merging in the horizontal portion 17 for facilitated guidance of edged boards and laths.

The two edging blades 7 and 8 are arranged for displacement towards and away from each other. At this, at least one of the blades is adapted to be able to be displaced up to the centre of the edger, i.e. the centre of the infeed and outfeed openings and of the infeed and outfeed tables, substantially corresponding to the section line II—II of FIG. 1.

Since the driving and displacement means for the blades are equal for both blades, only the left hand half of FIG. 1, concerning the blade 7, will be described.

In the walls 2 and 3 of the stand 1 mutually parallel shafts 25 and 26 substantially extending in the feeding direction are journalled in bearings 21, 22 and 23, 24, respectively. On these shafts are swingably mounted the lower ends of substantially vertical, mutually parallel pendulum arms 27 and 28, respectively. In bearings 29 and 30 in the upper ends thereof are journalled stub shafts 31 and 32, respectively, being mutually parallel and parallel to shafts 25 and 26.

In practice, the two pendulum arms 27 and 28 are each composed of two arms spaced in the directions of the shafts and stub shafts just mentioned. In FIG. 2, thus, the upper end of the arm 28', being invisible in FIG. 1 and forming a part of pendulum arm 28, is partly visible, as is the associated bearing 30' and stub shaft 32'. (The reference numerals of FIG. 2 within brackets refer to some of the details corresponding to the visible details, but located beyond the drawing plane).

The stub shafts 31 and 32 extend from a block 33 which carries a drive assembly comprising a hydraulic motor 34 and flange jointed therewith a spindle housing 35 in which the spindle 36 of the blade 7 is journalled.

Between the shaft 26 and the stub shaft 32 the piston stem 37 of a hydraulic cylinder 38 is pivotably connected to the pendulum arm 28, the hydraulic cylinder in its turn being pivotably mounted on a plate 39, which is displaceable along the front wall 2. The position of displacement of the plate 39 is adjustable by means of an adjustment screw 40. By means of screws 41 the plate 39 is lockable relative to the wall 2.

As appears from FIG. 2 the blade 7 (and of course also blade 8) extends down into the space between the infeed and outfeed tables 14 and 15. Down into this space also the main part of the sawdust resulting from the edging operation is sprayed. In order to discharge this dust without contacting vital parts of the edger, the area at the sides of and underneath the space is shielded against the remainder of the housing 1 by means of plates 42, 43 extending from just below the spindle housing 35 down through the housing 1 to the flooring. Together with the wall 3 and a plate 44, located inside the wall 2, the plates 42 and 43 form a dust channel 45, which in a suitable manner underneath the housing 1 is connected to a dust discharge conduit not shown. The wall 2 and the plate 44 define a space 46 separated from the channel 45 and extending in the longitudinal direction of the edger and through which conduits to the motor 34 and the cylinder 38 as well as from a position detecting device 47, disposed in parallel with the cylinder 38, can be located protected from dust.

I claim:

1. An edger apparatus comprising:
   a housing defining a feeding plane for objects to be edged, and
   at least one edger including:
     at least two upright arms arranged substantially parallel to each other, said arms being spaced apart in a direction substantially perpendicular to the direction in which objects are fed through said feeding plane, lower ends of said arms being rotatably mounted to said housing for rotation about substantially horizontal axes disposed below and substantially parallel to said feeding plane,
     a link rotatably mounted to upper ends of said arms to define rotary upper axes which are parallel to said lower axes and disposed above said feeding plane,
     a drive motor connected to said link and depending downwardly therefrom such that said motor is disposed completely below said upper ends of said arms, said motor forming a rotary drive axis extending substantially parallel to said link,
     an edger member connected to an end of said motor for being driven thereby about said drive axis, and
     displacement means for rotating said arms about said lower axes to displace said upper ends of said arms and said edger member in the direction of said drive axis.

2. Apparatus according to claim 1, wherein said at least two arms comprises four arms, said motor being disposed between respective pairs of said arms.

3. Apparatus according to claim 1 including detecting means arranged for detecting the position of displacement of said edging member.

* * * * *